No. 877,984. PATENTED FEB. 4, 1908.
H. J. BOEKEN.
MACHINE FOR DIVESTING PARTS OF PLANTS OF THEIR FLESHY SUBSTANCE.
APPLICATION FILED JULY 24, 1906.
2 SHEETS—SHEET 1.
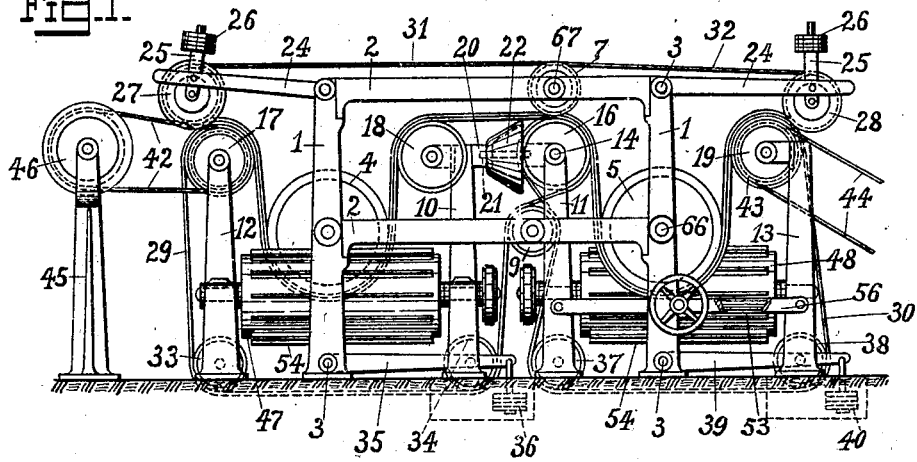
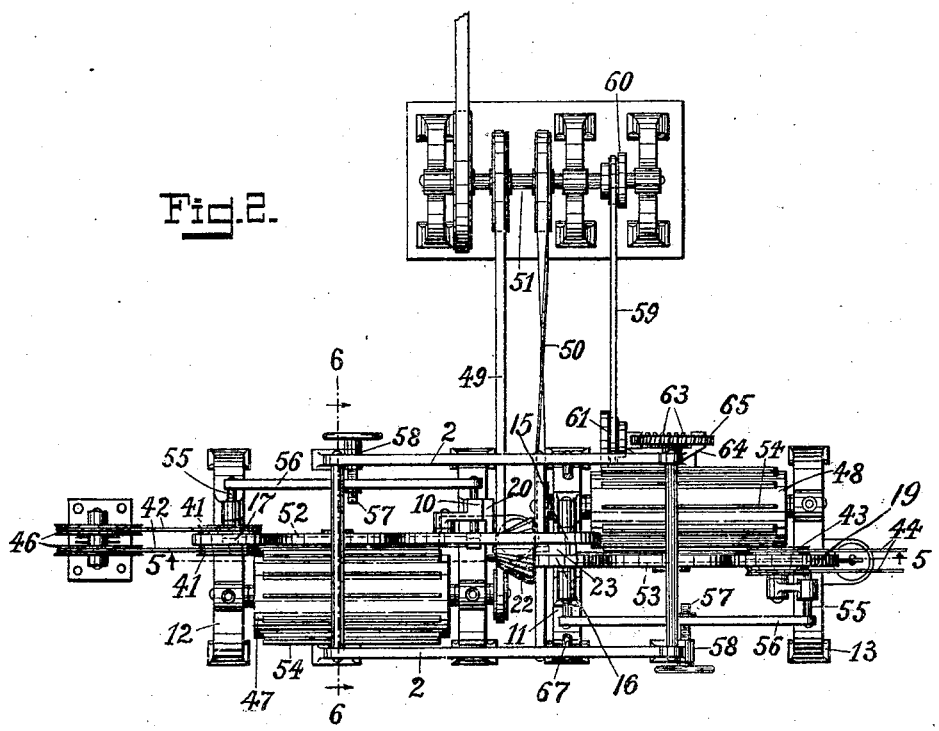
Witnesses:
F. G. Harder.
A. Frank.
Inventor:
Hubert J. Boeken
per Martin Schmetz
Attorney.

No. 877,984. PATENTED FEB. 4, 1908.
H. J. BOEKEN.
MACHINE FOR DIVESTING PARTS OF PLANTS OF THEIR FLESHY SUBSTANCE.
APPLICATION FILED JULY 24, 1906.
2 SHEETS—SHEET 2.
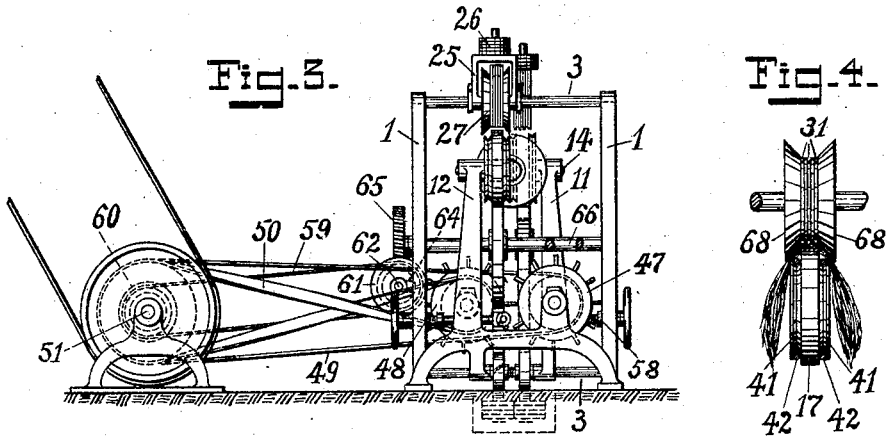
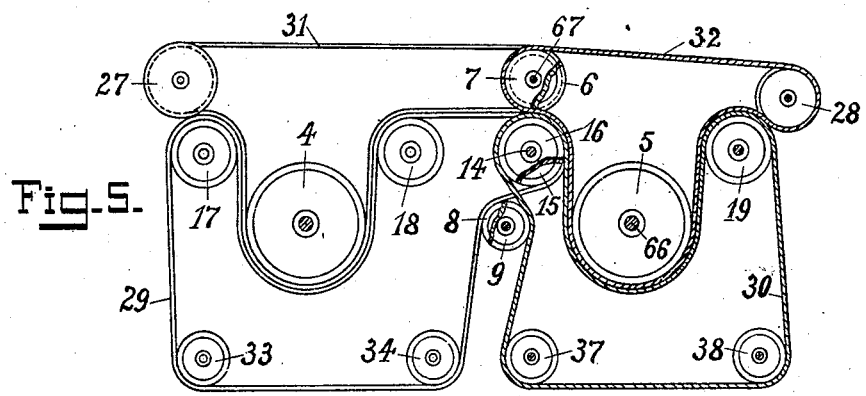
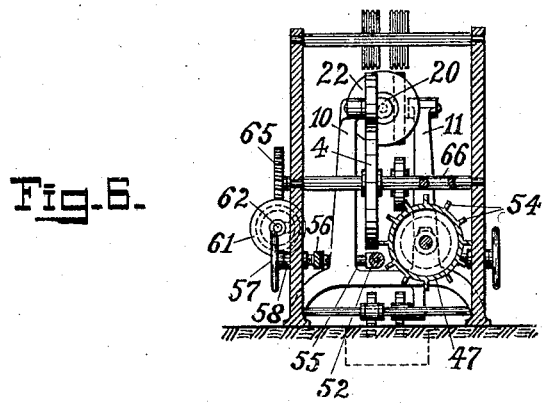
Witnesses:
F. G. Harder.
A. Frank.
Inventor:
Hubert J. Boeken
per Martin Schmetz
Attorney.

UNITED STATES PATENT OFFICE.

HUBERT J. BOEKEN, OF DUEREN, GERMANY.

MACHINE FOR DIVESTING PARTS OF PLANTS OF THEIR FLESHY SUBSTANCE.

No. 877,984.   Specification of Letters Patent.   Patented Feb. 4, 1908.

Application filed July 24, 1906. Serial No. 327,512.

*To all whom it may concern:*

Be it known that I, HUBERT J. BOEKEN, civil engineer, a subject of the King of Prussia, residing at Dueren, Rhineland, No. 6 Hohenzollernstrasse, in the Kingdom of Prussia, Empire of Germany, have invented certain new and useful Improvements in Machines for Divesting Parts of Plants of Their Fleshy Substance; and I do hereby declare the following to be a full, clear, and exact description of the invention, such as will enable others skilled in the art to which it appertains to make and use the same.

My present invention relates to a machine for divesting parts of plants of their fleshy substance, wherein the parts of plants conveyed by transport-means are on their downward way, point after point advancing, divested of their fleshy substance by the knives of rotatory scutchers on adjustable contact-pieces which offer but one line of contact to said knives, and wherein, when the parts of plants progressively ascend again, the previously bared fibers are completely freed from the fleshy particles still adhering to them between the scutcher-knives and said contact-pieces.

In the accompanying drawings:—Figure 1 is a side view of the machine. Fig. 2 is a plan view of the machine, from which for the sake of clearness the transport-ropes and their driving-means have been omitted. Fig. 3 is an end view of the machine and of the driving-gear. Fig. 4 is a detail view of the belt-pulley and the flanged rope-pulley for receiving and bending the parts of plants. Fig. 5 is a diagrammatic arrangement of the transport-belts and transport-ropes, partly shown as a sectional view taken on line 5—5 of Fig. 2. Fig. 6 is sectional view taken on line 6—6 of Fig. 2.

The frame of the machine consists of the vertical posts 1 held apart lengthwise of the machine by the tie-beams 2 and crosswise thereof by the stay-rods 3. In this frame are journaled the belt-pulleys 4 and 5, the rope-pulleys 6 and 7, and the guide-pulleys 8 and 9. Within this frame are arranged the pedestals 10 and 11 and endwise thereof the pedestals 12 and 13, of which the pedestal 11 possesses two arms for the support of the shaft 14 which carries the belt pulleys 15 and 16, whereas the other pedestals are one-armed and each of them carries one of the belt-pulleys 17, 18 and 19, as clearly shown in Fig. 1. The pedestal 10 is provided with a Z-shaped arm 20, Figs. 1 and 2, which holds the one end of the shaft 21 of the conic guide 22, whereas the other end of the shaft 21 is held in a sleeve 23 fulcrumed on the shaft 14. The conic guide 22 partly incases the pulleys 15 and 16 for a purpose explained later on. To the upper stay-rods 3 arms 24 are hinged in pairs, of which each pair carries a yoke 25 provided with a number of disk-shaped weights 26. In the yoke arranged adjacent the belt-pulley 17 is journaled a flanged rope-pulley 27, and in the yoke adjacent the belt-pulley 19 the rope-pulley 28.

The means employed to hold and transport the part of plants to be divested of their fleshy substance consist of the endless transport-belts 29 and 30 and the square transport-ropes 31 and 32 coöperating therewith. The transport-belt 29 runs over the belt-pulleys 17, 4, 18 and 15, guide-pulleys 8 and 33, and the belt-tightener 34. The guide-pulley 33 is carried by the pedestal 12 and the belt-tightener 34 by a lever 35, fulcrumed on one of the lower stay-rods 3 and provided with a weight 36. In a similar manner the transport-belt 30 runs over the belt-pulleys 16, 5 and 19, the guide-pulleys 37 and 9 and the belt-tightener 38, of which the guide-pulley 37 is carried by the pedestal 11 and the belt-tightener 38 by a lever 39 fulcrumed on the other lower stay-rod 3 and provided with a weight 40. The transport-ropes 31 are guided by the rope-pulleys 6 and 27 and follow the transport-belt 29 from the pulley 17 to the pulley 15, whereas the transport-ropes 32 are guided by the rope-pulleys 7 and 28 and follow the transport-belt 30 from the belt-pulley 16 to the belt-pulley 19, Figs. 1 and 5.

The belt-pulley 17 is provided with lateral rims 41 for the reception of the feed-ropes 42 Fig. 4, likewise the belt-pulley 19 with similar rims 43 for the depositing-ropes 44. In front of the belt-pulley 17 is arranged a standard 45, in which a rope-pulley 46 in shape of two separated pulleys seated upon a common hub is journaled. This rope-pulley and the belt-pulley 17 are connected with each other by said feed-ropes 42, which serve to feed the parts of plants of which the fleshy substance is to be removed into the machine. A similar but lower standard (not shown) is provided at the rear-end of the machine, where the depositing-ropes 44 serve to carry the bared fibers to a depositing place. These depositing-ropes 44 are guided in a manner similar to that of the feed ropes 42.

The rotatory scutchers 47 and 48 are provided with knives 54. The scutcher 47 is journaled in the pedestals 10 and 12 and the scutcher 48 in the pedestals 11 and 13. These scutchers receive their motion by means of the belts 49 and 50 from the countershaft 51 and in order to let the scutchers rotate in opposite directions the scutcher 47 is driven by the open belt 49 and the scutcher 48 by the crossed belt 50, so that the scutcher 48 must rotate in a direction opposite to that of the scutcher 47.

In order to reduce the consumption of power to a minimum the contact pieces 52 and 53, against which the parts of the plants to be divested of their fleshy substance bear and by which they are sustained during the divesting operation of the scutcher-knives 54, have the shape of rollers journaled in guide-arms 55, which are connected with each other by a bar 56. To adjust the contact pieces an adjusting screw 57 is screwed into each of said bars 56 and held against longitudinal displacement by an eye 58 of the machine-frame, Figs. 1, 2, 3 and 6.

The transport belts 29 and 30 and the transport-ropes 31 and 32 are set in motion by the counter-shaft 51 by means of the belt 59 and the stepped pulleys 60 and 61, of which the former is seated on the counter-shaft 51 and the latter on the shaft 62 of the worm 63 journaled in the bracket 64, Figs. 2 and 3. The worm 63 drives the worm-wheel 65 seated upon the shaft 66 of the pulley 5, by means of which motion is imparted to the transport-belt 30 and the transport-ropes 32. Of these the belt 30 transmits power to the pulley 16 and also to the pulley 15 both seated on the shaft 14, by which means motion is imparted to the transport-belt 29, whereas the transport-ropes 32 transfer their motion to the rope-pulley 7 of the shaft 67 journaled in the upper tie-beam 2. On the shaft 67 is also seated the rope-pulley 6 which imparts its motion to the transport-ropes 31.

If now any of the parts of plants are thrown on the feed-ropes 42 they will be carried forward to the rope-pulley 27, which will take hold of them and bend them by means of its lateral flanges 68 into the shape shown in Fig. 4, whereupon they are carried downward by the transport-belt 29 and the transport-ropes 31. As soon as the ends of the parts of plants have reached the rotatory contact-piece 52 their fleshy substance will be removed from the fibers point after point, so that on the one hand a withdrawal of the parts of plants from between the belt 29 and the ropes 31 need not be feared, and on the other hand a forcible tearing of the fibers, as hitherto it frequently happened when the parts of plants were laterally introduced, is altogether avoided, besides which the required motive power is reduced to a minimum. The moment the parts of plants have passed the lowest point of the pulley 4 the removal of their fleshy substance ceases and when subsequently the bared fibers ascend, such particles of the fleshy substance as still may adhere to them are removed by the knives of the scutcher 47. The fibers thus bared are then advanced toward the conic guide 22, and as the ends of the parts of plants still in possession of the fleshy substance are rigidly held by the belt 29 and ropes 31 until they have passed a vertical plane which passes through the center of shaft 14, the bared fibers are drawn over the guide 22, drop on the transport-belt 30 and are carried upward by the latter until they come into contact with the transport-ropes 32 too, at which moment the bared fibers will be securely held between said transport-belt 30 and transport-ropes 32. Simultaneously herewith the ends of the parts of plants held until now by the belt 29 and the ropes 31 are given free and drop down to be gradually brought into contact with the adjustable and rotatory contact-piece 53 arranged alongside of the scutcher 48, by whose knives the remaining part of the fleshy substance will be removed. During the subsequent ascent the still adhering remnants of the fleshy substance are removed between said knives and said contact-piece 53, and finally the fibers now wholly bared and cleaned from the fleshy substance are dropped on the depositing-ropes 44 to be carried to a depositing place.

I claim:—

1. In a machine for divesting parts of plants of their fleshy substance the combination with a knife-armed scutcher having a circumferential velocity in excess of the downward motion of the descending parts of plants; of a voluntarily rotating contact piece arranged below a horizontal plane passing through the axis of said scutcher and laterally of the latter, a conveyer-pulley arranged laterally of said scutcher and above and adjacent to said contact-piece, and means for retaining the parts of plants on the conveyer-pulley during their divestation on their descent, substantially as set forth.

2. In a machine for divesting parts of plants of their fleshy substance the combination with a knife-armed scutcher having a circumferential velocity in excess of the downward motion of the descending parts of plants, of a voluntarily rotating and with respect to said scutcher adjustable contact-piece arranged below a horizontal plane passing through the axis of said scutcher and laterally of the latter, a conveyer-pulley likewise arranged laterally of said scutcher and vertically above said contact-piece to closely approach said contact-piece, and means for securely retaining said parts of plants on said conveyer-pulley during their divestation on their descent, substantially as set forth.

In testimony whereof I have signed my name to this specification in the presence of two subscribing witnesses.

HUBERT J. BOEKEN.

Witnesses:
HENRY QUADFLIEG,
EMMA KAHR.